UNITED STATES PATENT OFFICE.

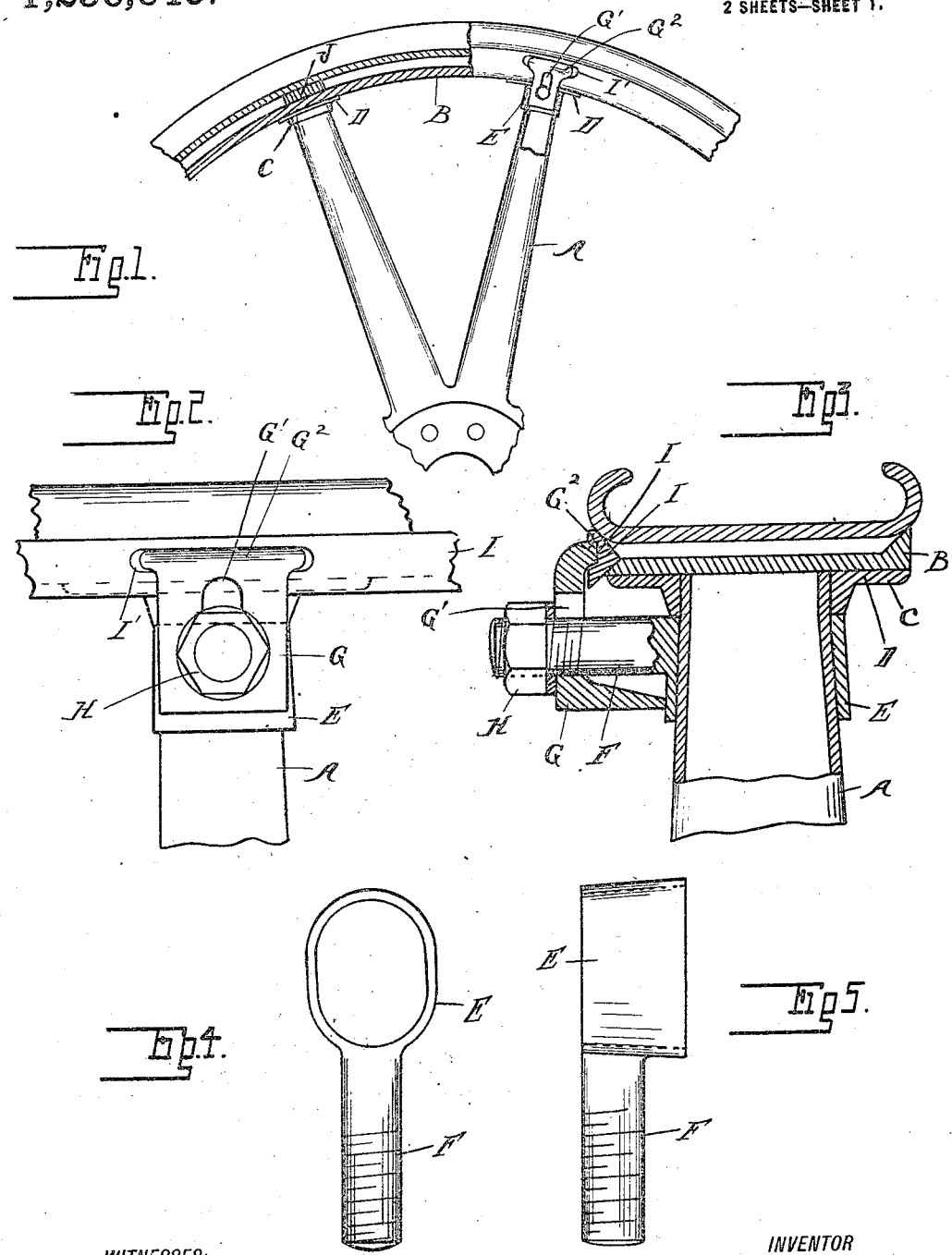

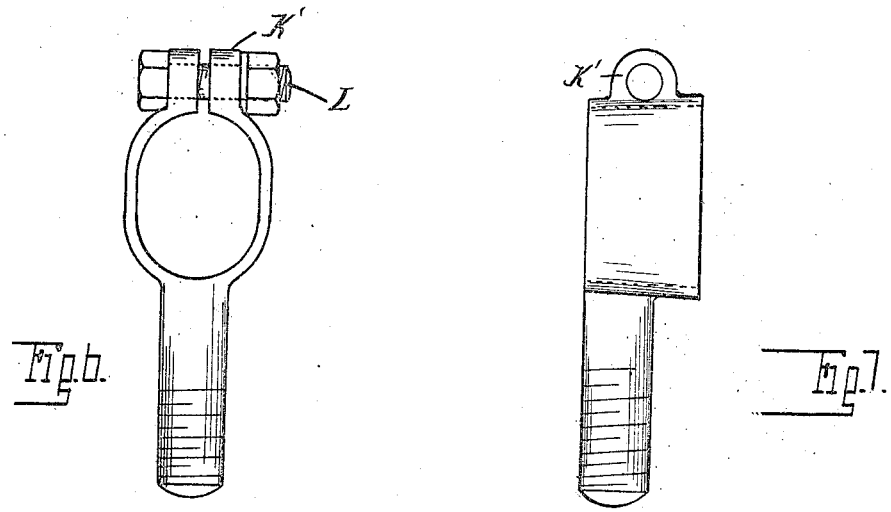
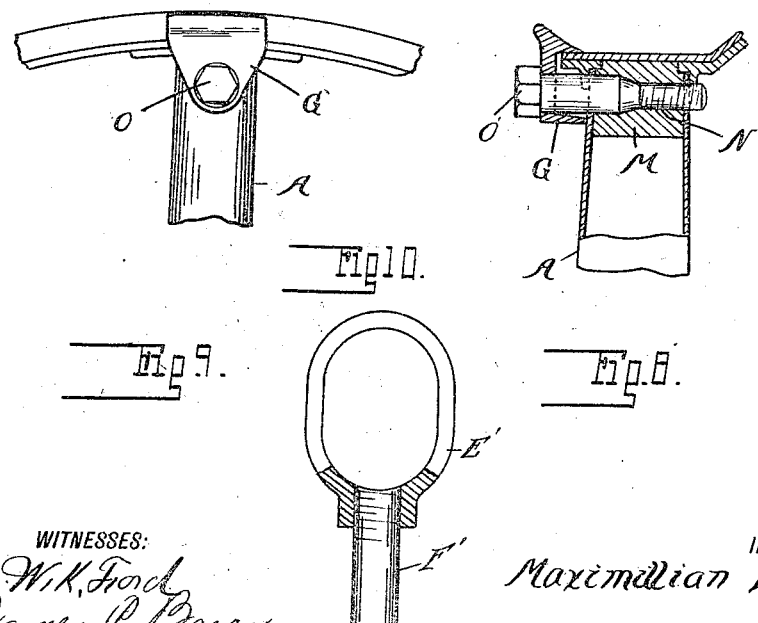

MAXIMILLIAN BACHEM, OF DETROIT, MICHIGAN.

METALLIC WHEEL.

1,256,640.  Specification of Letters Patent.  Patented Feb. 19, 1918.

Application filed April 22, 1915. Serial No. 22,979.

*To all whom it may concern:*

Be it known that I, MAXIMILLIAN BACHEM, a subject of the King of Great Britain and Ireland, residing at Detroit, in the county of Wayne and State of Michigan, have invented certain new and useful Improvements in Metallic Wheels, of which the following is a specification, reference being had therein to the accompanying drawings.

The invention relates to metallic wheels and has for its object the obtaining of a construction adapted for use in connection with demountable rims. To this end the invention comprises the novel construction as hereinafter set forth.

In the drawings,

Figure 1 is a side elevation of a portion of a metallic wheel with the securing means for a demountable rim attached thereto;

Fig. 2 is an enlarged elevation of the securing device;

Fig. 3 is a cross section at right angles to Fig. 2;

Fig. 4 is a plan view of a clamping stud and socket bearing;

Fig. 5 is a side elevation thereof;

Fig. 6 is a plan view similar to Fig. 4, showing a modified construction;

Fig. 7 is a side elevation thereof;

Fig. 8 shows another modification in cross section;

Fig. 9 is a side elevation of Fig. 8; and

Fig. 10 shows another modification.

The metallic wheel to which my improvements are applied is one in which a spider or spoke section is formed of metallic stampings welded or otherwise secured to each other, so as to form a series of hollow spokes. The outer ends of the spokes A are attached to a metallic rim B, usually by socket members C fitting over the ends of the spokes and having flanges D which are welded or otherwise attached to the rim. To adapt this structure for engagement of a demountable rim provision is made for the attachment of the clamps to the ends of the spokes. As shown in Figs. 1 to 5, socket members E provided with laterally-extending threaded studs F are arranged to fit over the end portions of the spokes adjacent to the sockets C. In the assembly of the wheel these members E are first engaged with the spokes, and by reason of the fact that the spokes are tapered the socket members will be firmly seated thereon and held in position by the sockets C and flanges D, the socket members reinforcing the spokes. The studs F are adapted for receiving the usual clamping plate G, and a nut H on the stud is used for tightening this plate against the wedge-ring or bearing I, as shown in Fig. 3. It is usual to employ a lesser number of clamps than the number of spokes, and where this is the case the rim B opposite the intermediate spokes may be provided with an outwardly-projecting bearing J, as shown in Fig. 1. Thus the load and the shocks transmitted from the tire to the wheel center will be carried directly from the demountable rim to the permanent rim in alinement with the spokes. This forms a stronger and more rigid connection than that usually applied to wooden wheels.

The clamping plates G are provided with slotted apertures G' for engagement with the studs F so as to permit the radial movement of the wedge-bearings. It is usual to place a shoulder upon the felly of the wheel for supporting the lower end of the clamping plate when the clamp is released, but with my improved construction I avoid the necessity of such support by forming a recess or groove I' in the wedge-member I and a projection $G^2$ on the member G for engaging said recess, as shown in Fig. 3.

In case of the breakage of one of the studs F it would be impossible to replace the same with the construction shown in Figs. 4 and 5. I therefore have provided a repair construction, preferably as shown in Figs. 6 and 7, and in which the stud F is provided with a split socket member K having apertured ears K' and a clamping bolt L. With this construction the sides of the socket may be opened out a sufficient distance to pass over a spoke, and by then engaging the clamping bolt L the socket may be securely fastened to the spoke.

With certain constructions of demountable rim, in place of threaded studs and clamping bolts threaded bolts are used. To adapt my wheel for use with this device the spoke A is provided with a plug or core M, which is welded, brazed or otherwise secured therein, and is transversely bored and adapted to form a threaded aperture N. A clamping bolt O may then be engaged with this threaded aperture and will serve to secure the clamping plates G. With all of the various modifications the clamp is secured to the end of the spoke and the bearings for the demountable rim are in alinement with the spokes, so as to form a rigid structure.

In Fig. 10 a further modification is shown, in which the stud F' has a threaded engagement with the socket member E' instead of being formed integral therewith.

What I claim as my invention is:—

1. The combination with a wheel having a metallic rim and hollow metallic spokes secured thereto, of socket members sleeved upon said spokes adjacent to said rim, a demountable rim on the metallic rim, and threaded studs for clamping said demountable rim secured to said sockets.

2. The combination with a wheel having a rim and hollow metallic spokes secured thereto and tapering toward their outer ends, of socket members sleeved upon the tapering portions of said spokes adjacent to said rim, a demountable rim on said other rim, and threaded studs for clamping said demountable rim, engaging said socket members.

3. The combination with a wheel having a metallic rim and metallic hollow spokes secured thereto, of a demountable rim, and clamping devices for said demountable rim on said metallic rim comprising threaded studs and sockets integral with said studs embracing said spokes adjacent to said rim and secured thereto.

4. In a wheel, the combination with a metallic rim, a metallic spider having hollow tapering spokes, flanged socket members securing the outer ends of said spokes to said rim, a demountable rim, and a clamping device for said demountable rim, comprising a socket member sleeved on said tapering spoke adjacent to the securing socket thereon, and a threaded stud projecting laterally from said socket member.

5. The combination with a wheel having a metallic rim and metallic hollow spokes secured thereto of a demountable rim on said metallic rim, clamping devices for said demountable rim comprising a wedge ring, studs secured to and projecting from said hollow spokes, slotted clamping plates engaging said studs, having inwardly-extending portions for bearing on said spokes, and hooked portions for engaging a recess in said wedge ring.

In testimony whereof I affix my signature in presence of two witnesses.

MAXIMILLIAN BACHEM.

Witnesses:
JAMES P. BARRY,
ARTHUR D. PULVER.